US006776390B1

(12) United States Patent
Boecking

(10) Patent No.: US 6,776,390 B1
(45) Date of Patent: Aug. 17, 2004

(54) VALVE FOR CONTROLLING FLUIDS

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/049,945

(22) PCT Filed: Aug. 1, 2000

(86) PCT No.: PCT/DE00/02534

§ 371 (c)(1),
(2), (4) Date: May 29, 2002

(87) PCT Pub. No.: WO01/14731

PCT Pub. Date: Mar. 1, 2001

(30) Foreign Application Priority Data

Aug. 20, 1999 (DE) ........................................ 199 39 488
Jan. 22, 2000 (DE) ........................................ 100 02 720

(51) Int. Cl.[7] ................................................ F16K 31/02
(52) U.S. Cl. ................ 251/129.06; 310/346; 239/103.2
(58) Field of Search ........................... 251/129.06, 318; 123/90.19; 310/346, 328; 239/102.1, 102.2

(56) References Cited

U.S. PATENT DOCUMENTS 4,284,263 A * 8/1981 Newcomb .............. 251/129.06
4,550,744 A * 11/1985 Igashira et al. ............... 137/80
5,740,969 A * 4/1998 Hoffmann et al. ....... 239/533.2
5,821,671 A * 10/1998 Trzmiel ...................... 310/328
6,454,239 B1 * 9/2002 Boecking ............... 251/129.06

FOREIGN PATENT DOCUMENTS

DE 19849203 A * 4/2000
DE 19909106 A * 9/2000
EP 0869278 A * 10/1998

* cited by examiner

*Primary Examiner*—Edward K. Look
*Assistant Examiner*—John K. Fristoe, Jr.
(74) *Attorney, Agent, or Firm*—Ronald E. Greigg

(57) ABSTRACT

A valve for controlling fluids is proposed that for its actuation cooperates with a piezoelectric actuator (2). To compensate for changes in the length of the piezoelectric actuator (2) in the stroke direction that are caused by temperature changes, a compensation element (7) is provided, which comprises a material that has a coefficient of thermal expansion that is approximately equivalent to that of the piezoelectric actuator (2). The piezoelectric actuator (2) and compensation element (7), upon a certain temperature change, exhibit a comparable change in their length in the stroke direction. As a result, the change in length of the piezoelectric actuator with the temperature is compensated for. The valve is intended for use in fuel injection devices for internal combustion engines.

20 Claims, 3 Drawing Sheets

VALVE FOR CONTROLLING FLUIDS

CROSS-REFERENCE TO RELATED APPLICATIONS

This is a 35 USC 371 application of PCT/DE 00/02534, filed on Aug. 1, 2000.

BACKGROUND OF THE INVENTION

1. Field of the Invention

The invention relates to a valve for controlling fluids and particularly to an improved valve having an actuator piston actuated by a piezoelectric actuator.

2. Description of the Prior Art

One such valve is known from European Patent Disclosure EP 0 477 400 A1, for instance. There, the actuating piston of the valve member is disposed displaceably in a smaller-diameter part of a stepped bore, while conversely a larger-diameter piston, which is moved by a piezoelectric actuator, is disposed in the larger-diameter part of the stepped bore. Enclosed between the two pistons is a hydraulic chamber, such that when the larger piston is moved by the piezoelectric actuator, the actuating piston of the valve member is moved by a distance that is increased by the boosting ratio of the stepped bore diameters. The valve member, the actuating piston, the larger-diameter piston, and the piezoelectric actuator are located successively on the same axis.

If a piezoelectric actuator is to be usable as a control element, the change in length as a function of temperature must be compensated for. Since the stroke attainable by means of a piezoelectric actuator amounts to only between about 1/1000 and 1.5/1000 of its length, for many applications it is necessary for this tiny stroke to be boosted. The different coefficients of thermal expansion of the various materials used cause settling effects, which are sometimes greater in the stroke direction than the possible stroke caused by the piezoelectric actuator element.

To create a compensation for such variations, in the valve disclosed in EP 0 477 400 A1, a defined leak is provided in the hydraulic chamber. Upon slow changes in the valve structure, of the kind that can be caused temperature changes, for instance, the hydraulic fluid can escape through the leak and thus compensate for the effects in the stroke direction. The viscosity of the hydraulic fluid is selected such that upon rapid changes, of the kind caused by the piezoelectric actuator, the hydraulic fluid does not escape through the leak, and the deflection of the piezoelectric actuator is transmitted to the actuating piston. This compensation is very complicated and expensive, because it requires very close tolerances in the production of the pistons in order to be able to create a defined leak in the form of an annular gap between the piston and the surrounding cylinder wall. Furthermore, diverted hydraulic fluid must be returned to the hydraulic chamber again, for which purpose suitable devices must also be provided.

SUMMARY OF THE INVENTION

The valve for controlling fluids according to the invention has the advantage over the prior art that it is very simple in structure and can be produced economically. A ratio of coefficients of thermal expansion of approximately or equal to 1 is understood to mean values between 1.0 and approximately 1.1. In the ideal case, the ratio is 1.

In the valve of the invention, this means a markedly reduced number of parts. As a result, putting together the valve is simplified, and calibration operations are fewer, since fewer parts have to be calibrated. This means in particular that the production and assembly costs for the valve can be reduced markedly.

In a preferred exemplary embodiment of the invention, the compensation element is embodied as a cylindrical ring element, which surrounds the piezoelectric actuator. By means of this design of the compensation element, an optimal compensatory effect can be assured, since the piezoelectric actuator and the compensation element are exposed to the same temperature effects. This design of the compensation element also dictates a simple design of the valve of the invention.

Alternatively, it is also possible in an advantageous embodiment to dispose the compensation element merely parallel to the piezoelectric actuator. As a result, on the one hand the compensation element can assume various shapes, for instance cylindrical, or triangular or square in cross section, and so forth. In this respect, in terms of its shape the compensation element can be adapted to the spatial conditions of the valve design. By this means it can also be assured that the piezoelectric actuator and the compensation element are always located quite close together, so that the temperature factors affect both elements to the same extent.

In a further feature, the piezoelectric actuator and compensation element are disposed spatially near one another, preferably in a common chamber. In that case, temperature changes act in the same way on both parts, so that the changes in length of the piezoelectric actuator and the compensation element compensate for one another.

If the coefficients of thermal expansion of the piezoelectric actuator and compensation element are the same, then advantageously a design is selected in which the effective length of the compensation element is equivalent to the length of the piezoelectric actuator. The term "effective length" is understood to mean the expansion of the compensation element parallel to the axis of the piezoelectric actuator that is available for an expansion of the compensation element in the direction of the axis of the piezoelectric element.

It has proved to be suitable for the operation of the valve if the compensation element comprises Invar®.

In an advantageous embodiment, an air gap is provided between the transmission element and the booster. The air gap amounts to only a few micrometers. If the piezoelectric actuator and the compensation element do not have precisely the same coefficient of thermal expansion, then in this way a compensation for residual error can be achieved.

Advantageously, the transmission element includes a tie rod, and the compensation element is part of the tie rod. In this way, the transmission element is very simple to produce, and only slight problems from production variations occur.

A sturdy embodiment of the valve is attained if the booster is embodied as a mechanical booster, preferably as a lever.

In an advantageous feature of the invention, a support point of the lever is located in the axis of the piezoelectric actuator.

If the coefficients of expansion of the piezoelectric actuator and compensation element are not precisely the same, or if a longitudinal expansion of other materials is to be compensated for along with the longitudinal expansion of the piezoelectric actuator, then it is advantageous if the effective length of the compensation element is not equal to the length of the piezoelectric actuator.

BRIEF DESCRIPTION OF THE DRAWINGS

Exemplary embodiments of the invention are explained in further detail herein below, in conjunction with the drawings, in which.

DESCRIPTION OF THE PREFERRED EMBODIMENTS

Figure 1:
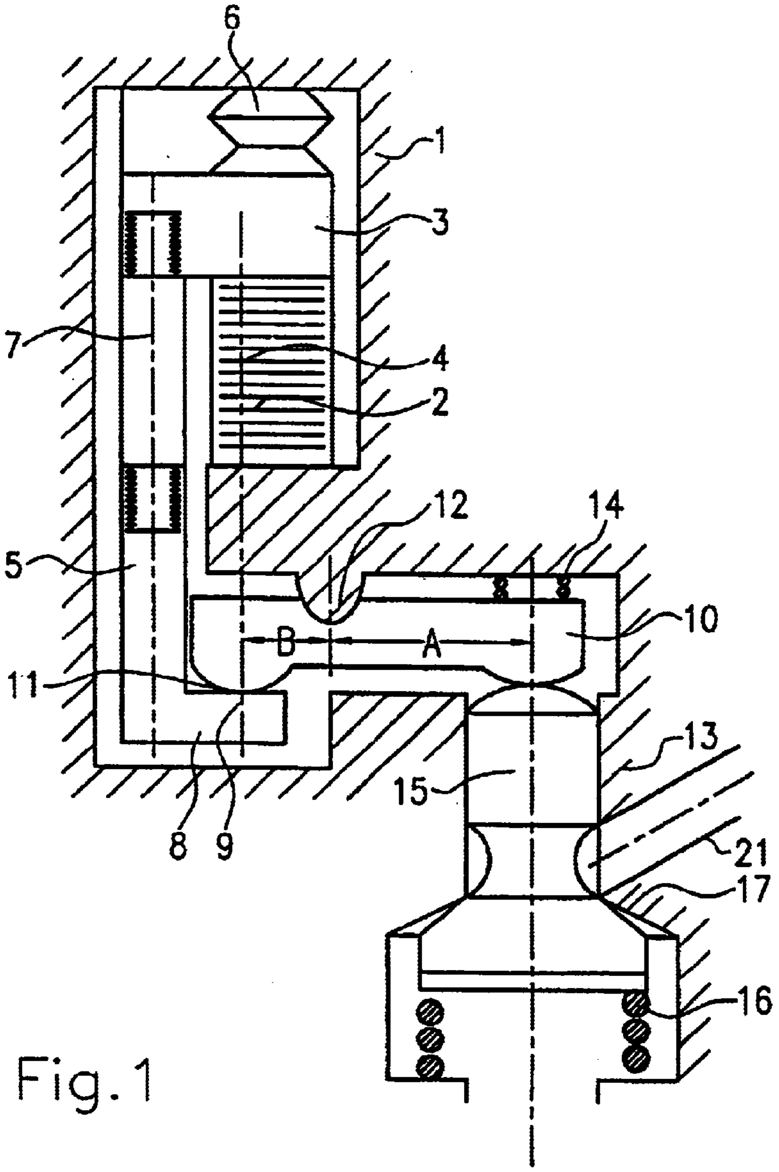
FIG. 1 is a sectional view of a fuel injection valve in a first exemplary embodiment

FIG. 1 shows a valve for controlling fluids in a first exemplary embodiment of the invention. The valve includes a housing 1, in which a piezoelectric actuator 2 is disposed. The free end of the piezoelectric actuator 2 is adjoined by a transmission element 3, which includes a tie rod 5 extending parallel to the axis 4 of the piezoelectric actuator 2. The piezoelectric actuator is prestressed by a cup spring 6. A compensation element 7, preferably made from Invar®, is integrated with the tie rod 8. The compensation element 7 is connected to the tie rod 5 here by means of a threaded connection. Other types of connection, such as adhesive bonding, can also be employed, however. The compensation element 7 and piezoelectric actuator 2 are approximately equal in length and are disposed spatially close together in a common chamber. The tie rod 5 is extended in the form of a leg 8, which forms the support point with the support point axis 9 for the lever 10. In FIG. 1, the support point axis 9 is not aligned with the axis 4 of the piezoelectric actuator. However, in a preferred embodiment of the valve of the invention for controlling fluids, the support point axis 9 can also be aligned with the axis 4 of the piezoelectric actuator 2.

Between the leg 8 and the lever 10, an air gap 11 is formed, in the position of repose. The air gap 11 amounts to only a few micrometers. The lever 10 is supported on the bearing 12, which divides the lever 10 into a shorter lever arm of length B and a longer lever arm of length A. The ratio A/B determines the boosting ratio. The lever 10 is prestressed by the compression spring 14, acting on the longer lever arm in the opening direction of the valve member 13. The longer lever arm of length A acts on the piston 15 of the valve member 13. In the position of repose, the piston 15 is pressed against the valve seat 17 by the compression spring 16, which has a higher spring constant than the compression spring 14.

Figure 2:
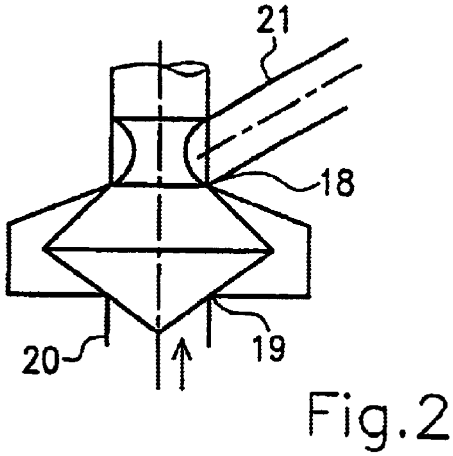
FIG. 2 is a version of the valve member as a double-acting valve.

In FIG. 1, the valve of the invention is shown as a single-acting outlet/inlet valve. However, an embodiment as a double-acting valve is also possible. Such an embodiment is shown in FIG. 2. This valve differs from the valve shown in FIG. 1 only in terms of the valve member. In FIG. 2, therefore only this portion is shown. The piston 15 can then come into contact with both an upper seat 18 and a lower seat 19. The inflow to the valve takes place via an inflow line 20, which in the valve shown extends from below up to the valve housing, while the outflow line 21 is disposed opposite the inflow line 20, above the upper valve seat.

Mode of Operation

In operation of the valve using a piezoelectric actuator 2, it is necessary to compensate for changes in length of the piezoelectric actuator 2, the valve itself, or the valve housing 1. The compensation element 7 serves this purpose and also provides residual error correction for the air gap 11.

Each time the piezoelectric actuator 2 is turned on, the transmission element 3 is lifted, counter to the prestressing of the cup spring 6. The stroke is transmitted via the tie rod 5 and the leg 8 to the shorter lever arm of the lever 10. Determined by the ratio of lever arm lengths A/B, the stroke of the piezoelectric actuator 2 is boosted to a corresponding stroke of the longer lever arm (A). The lever arm (A) moves in the opening direction of the valve member 13 and moves the piston 15 downward, counter to the force of the spring 16, as a result of which the line 21 is opened. When the piezoelectric actuator 2 is turned off, the transmission element 3 drops back into its position of repose, and the piston 15 is pressed against the seat 17 again by the force of the spring 16, as a result of which the line 21 is closed again. By the force of the spring 14, the lever 10 is returned to its position of repose, and the air gap 11 forms again.

In the version as a double-acting valve, shown in FIG. 2, accordingly when the piezoelectric actuator 2 is turned on, the piston 15 is pressed against the lower valve seat 19, and the inflow line 20 is closed and the outflow line 21 is opened. In the OFF state, correspondingly, the inflow 20 is opened and the outflow 21 is closed.

Upon temperature changes, the length of the piezoelectric actuator 2 changes along its axis in the stroke direction. To compensate for this change in length, the compensation element 7 is provided. It is made for instance from Invar® and has a coefficient of thermal expansion similar to that of the piezoelectric actuator 2. For the same temperature change, it therefore exhibits comparable changes in length. Since the piezoelectric actuator 2 and compensation element 7 are disposed spatially close together in the same chamber, they are subject to the same temperature factors. Thus both parts exhibit virtually the same changes in length. Slight differences in the coefficients of thermal expansion, which cause a residual error, are intercepted by the air gap 11. The air gap can be increased or decreased in size within certain limits, without affecting the function of the valve. The dimensioning of the air gap 11 is selected such that in both the cold state and at higher temperatures, no warping or excessive tolerances in the transmission of the stroke of the piezoelectric actuator 2 to the piston 15 will occur. If with increasing temperature the piezoelectric actuator 2 expands more markedly than the compensation element 7, then in this state at room temperature a somewhat larger air gap 11 must be provided, which becomes smaller as the temperature rises. Conversely, if with increasing temperature the compensation element 7 expands more markedly than the piezoelectric actuator 2, then in this state at room temperature a very small air gap 11 must be provided, which becomes larger with increasing temperature.

Figure 3:
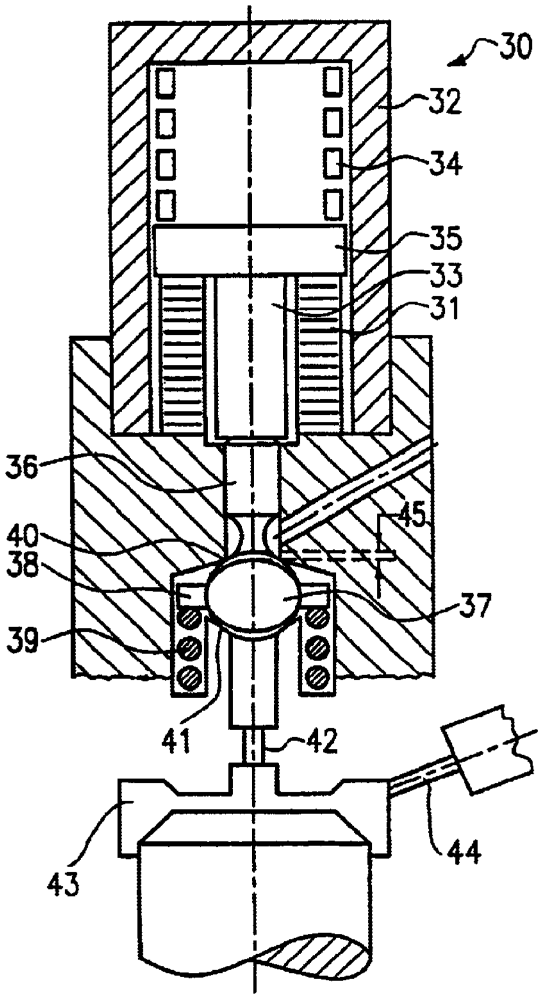
FIG. 3 a fuel injection valve in a second exemplary embodiment, in section.

FIG. 3 shows a valve for controlling fluids in a second exemplary embodiment of the invention. Although this valve 30 in terms of its construction differs considerably from the valve 1 of the first exemplary embodiment, the compensation element 31 used in the valve 30 is based on the same mode of operation as the compensation element 7 of the first exemplary embodiment.

The valve 30 includes a housing 32, in which a piezoelectric actuator 33 is disposed. Here the piezoelectric actuator 33 is prestressed inside the housing 32 by means of a prestressing element 34 in the form of a sealing spring and a piston 35. At the same time, the compensation element 31, which extends substantially concentrically and annularly around the piezoelectric actuator 33, is prestressed against the housing 32 of the valve 30 by the sealing spring 34.

The end of the piezoelectric actuator 33 opposite the piston 35 is adjoined by the piston 36, which is tapered on its free end and after its tapered point ends in a ball 37. The ball 37, as shown in FIG. 3, has a circumferential ring 38, by means of which the ball 37 is prestressed by a spring 39 into a first seat 40.

When electric current is delivered to the piezoelectric actuator 33, the piston 36 along with the ball 37 is shifted downward in terms of FIG. 3, putting the ball 37 into close contact with the second seat 41.

In the usual way, the second seat 41 is followed by the outflow throttle 42, the control chamber 43 with the inflow throttle 44, and on to the injection nozzle, not shown. Since the components leading onward are well known, they will not be described or shown here.

Also in the second exemplary embodiment of the valve of the invention, the same principle of the piezoelectric actuator 33 and compensation element 31 as in the first exemplary embodiment is employed. That is, upon temperature changes, the length of the piezoelectric actuator 33 changes along its axis in the stroke direction. To compensate for this change in length, the compensation element 31 is provided. It is produced from Invar® or ceramic, for instance, and has a coefficient of thermal expansion that is similar or preferably identical to that of the piezoelectric actuator 33. For the same temperature change, it therefore exhibits comparable changes in length. Since the piezoelectric actuator 33 and compensation element 31 are disposed spatially near one another in the same chamber, they are subject to the same temperature factors. Thus both parts exhibit virtually the same changes in length.

However, if slight differences in the coefficient of thermal expansion occur, resulting in a residual error, then this residual error can be intercepted by means of a gap 45 embodied between the piston 36 and the ball 37. The air gap can be increased or decreased in size within certain limits, without affecting the function of the valve. The dimensioning of the air gap 45 is selected such that in both the cold state and at higher temperatures, no warping or excessive tolerances in the transmission of the stroke of the piezoelectric actuator 33 to the piston 36 will occur. If with increasing temperature the piezoelectric actuator 33 expands more markedly than the compensation element 31, then at room temperature a somewhat larger air gap 45 must be provided, which becomes smaller as the temperature rises. Conversely, if with increasing temperature the compensation element 31 expands more markedly than the piezoelectric actuator 33, then at room temperature a very small air gap 45 must be provided, which becomes larger with increasing temperature.

Figure 4:
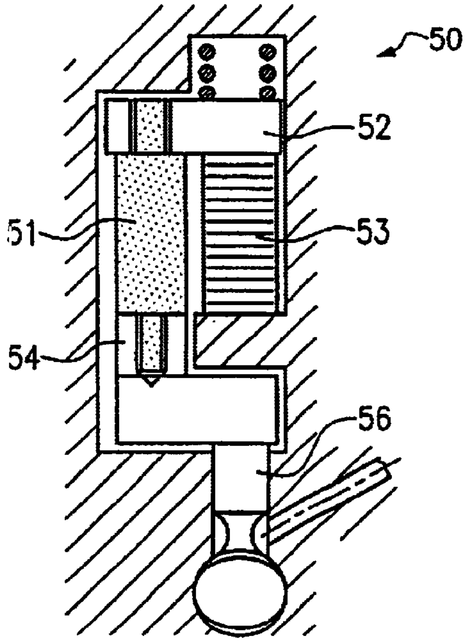
FIG. 4 a fuel injection valve in a third exemplary embodiment, in section.

FIG. 4 shows a third exemplary embodiment of a valve 50 of the invention. Since the valve 30 of the second exemplary embodiment largely matches the valve 50 of the third exemplary embodiment in terms of its design, only the differences between the two valves will be addressed below.

The valve 50 again includes a housing in which a piezoelectric actuator 53 is disposed. However, here the stroke of the piezoelectric actuator 53 is not transmitted directly to the piston 56; instead, as in the first exemplary embodiment of FIG. 1, a transmission element 52 is connected to the piezoelectric actuator 53. Furthermore, the transmission element 52 is connected to a compensation element 51, and the compensation element 51 is disposed parallel to the piezoelectric actuator 53. Finally, the compensation element 51 engages a lever 54, which in turn is connected to the piston 56. Thus in the valve 50 of the third exemplary embodiment, the same conditions are obtained as for the corresponding components of the first exemplary embodiment of FIG. 1, especially in terms of the mode of operation of the piezoelectric actuator 53 and the compensation element 51. In this respect it should be pointed out that the compensation elements of the first and third exemplary embodiments can have various symmetrical shapes in cross section, as needed. Attractive examples are a round, triangular or square cross-sectional shape.

Figure 5:
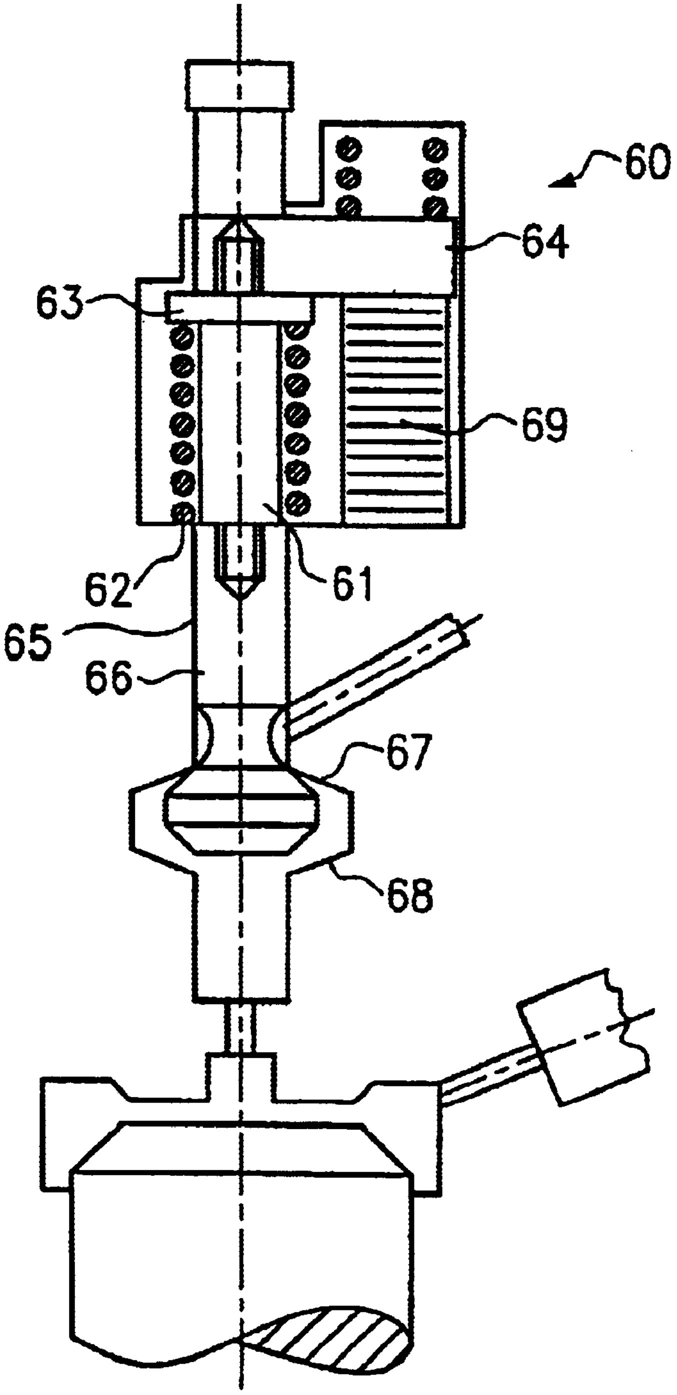
FIG. 5 is fuel injection valve in a fourth exemplary embodiment, in section.

Finally, in FIG. 5 a fourth exemplary embodiment of a valve 60 of the invention is shown. This valve 60 of FIG. 5 differs from the valve 50 of FIG. 4 in that the compensation element 61 is prestressed by a prestressing element in the form of a sealing spring 62. To that end, the compensation element 61 is connected on its upper end, in terms of FIG. 5, to a piston 63, which in turn is connected to a transmission element 64 and which is engaged by the sealing spring 62.

Also in the valve 60 of FIG. 5, unlike the valve 50 of FIG. 4, a guide 65 is provided, which extends in the axis of the compensation element 61 along with a piston 66 as far as the control valve with the first seat 67 and the second seat 68.

As a result, the compensation element 61 of the valve 60 in conjunction with the piezoelectric actuator 69 again dictates the same mode of operation as in the first-mentioned exemplary embodiments 1–3. In addition, it is naturally also possible in the third and fourth exemplary embodiments of FIGS. 4 and 5 for an air gap to be embodied between the piston and the associated valve member, in order to compensate for the residual error, explained in conjunction with the first and second exemplary embodiments, in the event of differences in the coefficients of thermal expansion between the piezoelectric actuator and the compensation element.

It has also been found that an especially good function of the valve of the invention is attained if the piezoelectric actuator and the control valve are located in virtually the same axis, and the piezoelectric actuator and the compensation element are located quite close together.

In conclusion, it should be noted that the valve of the invention in accordance with the various exemplary embodiments can be designed as either single- or double-acting. The embodiments according to the invention can also be employed in a 2/3-way control valve. It is also a common feature of the exemplary embodiments of FIGS. 1–3 that the applicable piezoelectric actuator is prestressed by a prestressing spring of low stiffness and with high prestressing force.

The foregoing relates to preferred exemplary embodiments of the invention, it being understood that other variants and embodiments thereof are possible within the spirit and scope of the invention, the latter being defined by the appended claims.

What is claimed is:

1. A valve for controlling fluids, comprising a piezoelectric actuator (2), whose stroke is transmitted to a valve member (13) by means of a transmission element (3), and a compensation element (7) spaced apart from the piezoelectric actuator (2), the compensating element compensating for temperature fluctuations of the piezoelectric actuator (2), and the ratio of the coefficient of thermal expansion of the piezoelectric actuator (2) and the coefficient of thermal expansion of the compensation element (7) is approximately or equal to 1, the compensation element (7; 51) being embodied in rodlike form and disposed parallel to and spaced apart from the piezoelectric actuator (2; 53).

2. The valve for controlling fluids of claim 1 wherein the piezoelectric actuator (2) and compensation element (7) are disposed spatially near one another, preferably in a common chamber.

3. The valve for controlling fluids of claim 2 wherein the effective length of the compensation element (7) is equivalent to the length of the piezoelectric actuator (2).

4. The valve for controlling fluids of claim 2 wherein the compensation element (7) comprises Invar® or ceramic.

5. The valve for controlling fluids of claim 2 further compromising an air gap (11) between the transmission element (3) and the booster (10).

6. The valve for controlling fluids of claim 2 wherein the transmission element (3) includes a tie rod (5), and wherein the compensation element (7) is part of the tie rod (5).

7. The valve for controlling fluids of claim 2 wherein the transmission element (3) transmits the stroke to the booster (10), and the booster is embodied as a mechanical booster, preferably as a lever.

8. The valve for controlling fluids of claim 1 wherein the effective length of the compensation element (7) is equivalent to the length of the piezoelectric actuator (2).

9. The valve for controlling fluids of claim 8 wherein the compensation element (7) comprises Invar® or ceramic.

10. The valve for controlling fluids of claim 8 further comprising an air gap (11) between the transmission element (3) and the booster (10).

11. The valve for controlling fluids of claim 8 wherein the transmission element (3) includes a tie rod (5), and wherein the compensation element (7) is part of the tie rod (5).

12. The valve for controlling fluids of claim 1 wherein the compensation element (7) comprises Invar® or ceramic.

13. The valve for controlling fluids of claim 12 further comprising an air gap (11) between the transmission element (3) and the booster (10).

14. The valve for controlling fluids of claim 1 further comprising an air gap (11) between the transmission element (3) and the booster (10).

15. The valve for controlling fluids of claim 14 wherein the transmission element (3) includes a tie rod (5), and wherein the compensation element (7) is part of the tie rod (5).

16. The valve for controlling fluids of claim 14 wherein the transmission element (3) transmits the stroke to the booster (10), and the booster is embodied as a mechanical booster, preferably as a lever.

17. The valve for controlling fluids of claim 14 wherein a support point of the lever (10) is located in the axis (9) of the piezoelectric actuator.

18. The valve for controlling fluids of claim 1 wherein the transmission element (3) includes a tie rod (5), and wherein the compensation element (7) is part of the tie rod (5).

19. The valve for controlling fluids of claim 1 wherein the transmission element (3) transmits the stroke to the booster (10), and the booster is embodied as a mechanical booster, preferably as a lever.

20. The valve for controlling fluids of claim 19 wherein a support point of the lever (10) is located in the axis (9) of the piezoelectric actuator.

* * * * *